United States Patent [19]

Rippie

[11] Patent Number: 4,588,512

[45] Date of Patent: May 13, 1986

[54] NONCORROSIVE DE-ICING COMPOSITION AND METHOD COMPRISING CALCIUM AND MAGNESIUM CARBOXYLATE

[76] Inventor: Wallace Rippie, 2030 Country Club Blvd., Ames, Iowa 50010

[21] Appl. No.: 765,178

[22] Filed: Aug. 13, 1985

Related U.S. Application Data

[63] Continuation of Ser. No. 455,607, Jan. 4, 1983, abandoned.

[51] Int. Cl.$^4$ .................. C09K 3/18; C07C 51/41; B32B 7/02
[52] U.S. Cl. .................. 252/70; 106/13; 427/212; 427/215; 428/403; 428/404; 428/701; 428/702
[58] Field of Search .................. 252/70; 106/13; 427/212, 215; 428/403, 404, 701, 702

[56] References Cited

U.S. PATENT DOCUMENTS

| | | | |
|---|---|---|---|
| 3,928,060 | 12/1975 | Smith et al. | 427/215 X |
| 3,954,649 | 5/1976 | Lamberti | 427/215 X |
| 4,243,415 | 1/1981 | Lowe, Jr. | 427/215 X |
| 4,247,331 | 1/1981 | Hamlin et al. | 252/70 X |
| 4,377,488 | 3/1983 | Gancy | 252/70 |
| 4,389,323 | 6/1983 | Gancy | 252/70 |
| 4,444,672 | 4/1984 | Gancy | 252/70 |

*Primary Examiner*—John Kittle
*Assistant Examiner*—Mukund J. Shah
*Attorney, Agent, or Firm*—Donald L. Cox

[57] ABSTRACT

This invention relates to the use of calcium or magnesium carboxylate coated aggregates as snow and ice control compositions. Also disclosed is a method for preparing these compositions by mixing lime and wetting agent coated sand and treating the resulting product with a carboxylic acid.

16 Claims, No Drawings

NONCORROSIVE DE-ICING COMPOSITION AND METHOD COMPRISING CALCIUM AND MAGNESIUM CARBOXYLATE

This is a continuation of co-pending application Ser. No. 06/455,607 filed on Jan. 4, 1983, abandoned.

BACKGROUND OF INVENTION

This invention relates to snow and ice control compositions. More particularly, the invention relates to compositions which are noncorrosive and do not cause degradation of roads and bridge decks or damage to roadside plants, when employed for controlling the buildup of snow and ice during winter weather.

For many years, salts, such as sodium chloride and calcium chloride, have been used for preventing the buildup of ice and snow on roads and for controlling or eliminating slippery road conditions. Other materials which have similarly been used include magnesium chloride and alkaline metal salts of iron cyanide, as disclosed in U.S. Pat. No. 3,505,234. In addition, various surfactant-type materials have been used as antifreezing additives. See, e.g., U.S. Pat. No. 3,378,493. It has also been disclosed in U.S. Pat. No. 4,247,331 to coat sand with calcium chloride and to use the resulting material for "treating ice covered roads during winter to produce improved traction". However, nearly all of the prior art systems are deficient in that most water soluble salt materials are extremely corrosive to metals which come in contact with them. For this reason, as the use of salt on highways has increased, automobile and truck body corrosion problems have also increased. In addition, bridge decking corrosion has increased markedly where salts are used as snow and ice control materials.

Thus, it is an object of this invention to prepare compositions which may be used for aiding in the melting of snow and ice.

It is another object of this invention to prepare compositions which may readily be spread from a tractor spreader.

It is another object of this invention to provide snow and ice removal compositions which do not have a significant corrosive effects on metals, plants or other materials to which they are exposed during use. In particular, it is desired that compositions be prepared which do not significantly increase the surface deterioration of highways or bridges and also do not unduly contribute to automobile or truck body corrosion problems.

These and other objectives are obtained by preparing the compositions of the instant invention.

SUMMARY OF INVENTION

This invention involves the discovery that various calcium or magnesium carboxylate-containing materials may be used as highway snow and ice removal compositions when coated onto an aggregate such as sand. Also involved is a process for preparing these compositions by coating the aggregate with a wetting agent, such as an amine acetate, mixing the coated aggregate with a calcium or magnesium hydroxide-containing material, and fully or partially neutralizing the resulting product with a $C_1$–$C_4$ carboxylic acid.

DETAILED DESCRIPTION OF INVENTION

The active ingredient in the noncorrosive ice and snow control compositions of the instant invention is either a magnesium carboxylate, a calcium carboxylate, or a calcium/magnesium carboxylate mixture, wherein the carboxylate group contains from 1 to 4 carbon atoms. Among the materials contemplated in the instant invention are the magnesium, calcium, or calcium/magnesium esters of formic, acetic, propionic and butyric acids, including mixtures thereof. The preferred compositions are the calcium/magnesium mixtures containing about 20 to about 80% by weight, based on the total mixture, of calcium carboxylate, with the remainder of the mixture being magnesium carboxylate. The preferred compounds are the calcium/magnesium acetates.

The calcium or magnesium carboxylate which is chosen is employed with an aggregate of convenient choice. Examples of the aggregates which may be used include sand, nutshells (such as walnut shells and pecan shells, pulverized corn cobs, ets.), expanded shale, fertilizer, urea and the like. The main requirement of the aggregate is that it possess sufficient density so that when it is coated with the noncorrosive composition of the invention and applied to the desired substrate, it will not easily be blown off the surface by ambient wind conditions.

The particular aggregate which is chosen depends upon the desired end use. In most highway applications sand is the aggregate of choice. The sand may be of any convenient type, although building sand is preferred. Regardless of the sand type which is chosen, however, it is preferred that the sand be washed to remove any residual clay content, since clays contribute to slippery road conditions well after snow and ice have melted. On airport runways, on the other hand, where there is a danger of ingesting the noncorrosive salt composition of this invention into jet engines, a combustible aggregate, such as ground nutshells, is preferred.

According to the instant invention, a calcium/magnesium carboxylate, magnesium carboxylate, or calcium carboxylate coating is applied to sand or other aggregates first by mixing in a conventional blender or mixer of any convenient type, approximately one part of the calcium, magnesium, or calcium/magnesium hydroxide with from about 0.75 to about 12 parts, by weight of aggregate. The preferred ratio is from about 1.5 to about 4.0 parts of aggregate for each part of hydroxide-containing material. Examples of the hydroxide-containing materials include agricultural or dolomite lime, as well as hydrated mason's lime. Other hydroxide materials may be simply the hydroxides of magnesium or calcium or mixtures thereof.

In order to facilitate coating of the aggregate with the hydroxide, it is preferred to use a wetting agent in amounts varying up to about 0.1%, by weight, based on the aggregate weight. The wetting agent usually is applied to the aggregate by mixing prior to the addition of the hydroxide-containing material. Numerous types of wetting agents may be used in this invention. Included predominantly are the so-called cement grinding aids, such as the amine acetates, the glycols, the alcohol and glycol amines, fatty acids, and formulated naphthalene, naphthenic acids. Specific examples of such materials include diethylene glycol, triethylene glycol, triethanolamine, hydroxyethyl ethylene diamine tetraacetic acid chelating agents and the like.

The second step in preparing the coated aggregate involves adding to the hydroxide/aggregate mixture a carboxylic acid, as described above. As pointed out above, nearly any low carbon-containing monocarboxylic acid may be used herein. However, acetic acid is preferred. The amount of the carboxylic acid which is added should be an amount sufficient to adjust the pH of the mixture to between about 7 and about 8.8. Lower pH solutions are corrosive to iron and steel materials.

It is preferred in carrying out the process of the instant invention to add the carboxylic acid over about 10 minutes to about one hour because of the exothermic nature of the reaction between the calcium/magnesium hydroxide and the carboxylic acid.

Following completion of the reaction, the mixture thus prepared is agitated in a mixer, such as a cement mixer, until a smooth, free flowing solid results. The period of time required for this step may range from 2–10 hours.

The resulting products may be employed in a variety of applications where it is necessary to melt snow or ice or to insure that ice does not form. While the primary intended use of the compositions herein is on roads and bridges and wherever noncorrosive ice and snow control products are required, it is also possible to employ these products on airport runways, roofs, sidewalks, and exterior coal, sand, or mineral piles. When applied to roads and bridges, the compositions of this invention may simply be spread in the same fashion that road sand and conventional salt is spread—usually from a moving truck or sander. However, these compositions may also be spread by hand or by using other methods, particularly where small scale applications are involved.

In the following examples all parts and percentages are by weight unless otherwise indicated.

EXAMPLE 1

A 2.0 percent by weight aqueous solution of CGA, an amine acetate cement grinding aid, available from W. R. Grace Company, having a specific gravity of 1.16, a weight per gallon of 9.66 pounds and a pour point of −49° F., was added at the 0.02% by active ingredient weight level to warm, dry sand, and stirred for 20 minutes. To 500 g. of this mixture were added 250 g. of hydrated Mason's lime. Following agitation of the mixture, 420 ml. of 99% glacial acetic acid were then added to the sand/lime mixture over 20 minutes to neutralize the lime. During addition, the temperature of the mixture rose to 140° F. Agitation of the mixture was continued for about 5 hours. A product resulted which exhibited excellent snow and ice removal properties on roadway surfaces. At the same time the product did not unduly corrode iron or steel panels.

EXAMPLE 2

Example 1 was repeated, except that the dolomite lime was replaced by a 60/40 mixture of hydrated lime (CA(OH)$_2$) and magnesium hydroxide. Results similar to those of Example 1 were obtained.

What is claimed is:

1. A snow and ice control material for a surface, said material comprising an aggregate coated with a combination of a cement grinding aid and a composition selected from the group consisting of magnesium carboxylate and calcium carboxylate and mixtures thereof, wherein the carboxylate comprises from about 16.5 to 76 percent by weight on a dry weight basis of said material, wherein the carboxylate groups contains from 1 to 4 carbon atoms and wherein the aggregate possesses sufficient density so that when it is coated with the carboxylate and applied to the surface it will not readily be blown off of the surface by ambient wind conditions.

2. The material of claim 1 wherein the carboxylate is acetate.

3. The material of claim 1 wherein the aggregate is selected from the group consisting of sand, nutshells, expanded shale, fertilizer, and urea.

4. The material of claim 1 wherein the aggregate is sand.

5. The material of claim 1 wherein the cement grinding aid is selected from the group consisting of amine acetates, glycols, alcohols, glycol amines, fatty acids and formulated naphthalenes.

6. The material of claim 1 wherein the cement grinding aid is amine acetate.

7. A snow and ice control composition for application to a surface said composition comprising a reaction product of an hydroxide material selected from magnesium hydroxide, calcium hydroxide and mixtures thereof with a C$_1$–C$_4$ carboxylic acid in the presence of a cement grinding aid and an aggregate wherein the aggregate possesses sufficient density so that when it is coated with the carboxylate and applied to the surface it will not readily be blown off the surface by ambient wind conditions.

8. The material of claim 7 wherein the ratio of the hydroxide material to the aggregate is in the range of 1 to 0.75 to 1 to 12 by weight.

9. A process for preparing a snow and ice control composition for application to a surface, said process comprising:
   (a) coating an aggregate with a cement grinding aid wherein the aggregate possesses sufficient density so that when it is coated with the carboxylate and applied to the surface it will not readily be blown off the surface by ambient wind conditions;
   (b) mixing the coated aggregate with a compound selected from calcium hydroxide, magnesium hydroxide and mixtures thereof; and
   (c) reacting at least a portion of the hydroxide groups with a carboxylic acid having from 1 to 4 carbon atoms.

10. The process of claim 9 wherein the ratio of the hydroxide material to the aggregate is in the range of 1 to 0.75 to 1 to 12 by weight.

11. The process of claim 9 wherein the cement grinding aid is selected from the group consisting of amine acetates, glycols, alcohols, glycol amines, fatty acids and formulated naphthalenes.

12. The process of claim 9 wherein the cement grinding aid is an amine acetate.

13. The process of claim 9 wherein the compound is a mixture of calcium and magnesium hydroxide and the carboxylic acid is acetic acid.

14. The process of claim 9 wherein the mixture is agitated for up to 12 hours following the reaction step.

15. The process of claim 9 wherein the aggregate is selected from sand, nutshells, expanded shale, fertilizer, and urea.

16. The process of claim 9 wherein the aggregate is sand.

* * * * *

UNITED STATES PATENT AND TRADEMARK OFFICE
CERTIFICATE OF CORRECTION

PATENT NO. : 4,588,512
DATED : May 13, 1986
INVENTOR(S) : Wallace Rippie

It is certified that error appears in the above-identified patent and that said Letters Patent is hereby corrected as shown below:

Column 2, line 17, "ets." should read -- etc. --.

Signed and Sealed this

Twelfth Day of August 1986

[SEAL]

Attest:

DONALD J. QUIGG

Attesting Officer   Commissioner of Patents and Trademarks